(12) United States Patent
Tiana et al.

(10) Patent No.: US 9,766,465 B1
(45) Date of Patent: Sep. 19, 2017

(54) NEAR EYE DISPLAY SYSTEM AND METHOD FOR DISPLAY ENHANCEMENT OR REDUNDANCY

(71) Applicant: Rockwell Collins, Inc., Cedar Rapids, IA (US)

(72) Inventors: Carlo L. Tiana, Portland, OR (US); Sarah Barber, Cedar Rapids, IA (US); Kenneth A. Zimmerman, Sherwood, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/005,507

(22) Filed: Jan. 25, 2016

Related U.S. Application Data

(63) Continuation of application No. 14/225,062, filed on Mar. 25, 2014, now Pat. No. 9,244,280.

(51) Int. Cl.
*G02B 27/01* (2006.01)
*G02B 27/14* (2006.01)
(Continued)

(52) U.S. Cl.
CPC ..... *G02B 27/0172* (2013.01); *G02B 27/0093* (2013.01); *G02B 27/01* (2013.01);
(Continued)

(58) Field of Classification Search
CPC .. G02B 27/01; G02B 27/0101; G02B 27/017; G02B 27/0172; G02B 27/10; G02B 27/1066; G02B 27/22; G02B 2027/011; G02B 2027/0138; G02B 2027/014; G02B 2027/0169; G02B 2027/0178; G09G 5/00;
(Continued)

(56) References Cited

U.S. PATENT DOCUMENTS

| 2,141,884 A | 12/1938 | Sonnefeld |
| 3,620,601 A | 11/1971 | Waghorn |

(Continued)

FOREIGN PATENT DOCUMENTS

| CN | 200944140 Y | 9/2007 |
| CN | 101881936 A | 11/2010 |

(Continued)

OTHER PUBLICATIONS

Non-Final Office Action on U.S. Appl. No. 14/152,756, dated Apr. 26, 2016, 17 pages.
(Continued)

*Primary Examiner* — Loha Ben
(74) *Attorney, Agent, or Firm* — Donna P. Suchy; Daniel M. Barbieri

(57) ABSTRACT

An apparatus provides a virtual display in an environment for various applications including avionic, naval, military, remote control, medical and other applications. The apparatus can be a near eye display, such as, a head up display (HUD) or head worn display (e.g., helmet mounted display (HMD), glasses-based, goggle-based, visor-based, etc.). The near eye display can include a combiner for providing one or more of: an image for a failed display, an image between two or more head down displays, or an image to direct attention to warnings or locations in the field-of-view of the combiner.

19 Claims, 4 Drawing Sheets

(51) Int. Cl.
*G09G 5/00* (2006.01)
*G02B 27/00* (2006.01)
*G06F 3/147* (2006.01)

(52) U.S. Cl.
CPC ....... *G02B 27/0101* (2013.01); *G02B 27/017* (2013.01); *G02B 27/0149* (2013.01); *G02B 27/14* (2013.01); *G09G 5/00* (2013.01); *G02B 2027/011* (2013.01); *G02B 2027/0138* (2013.01); *G02B 2027/0141* (2013.01); *G02B 2027/0165* (2013.01); *G06F 3/147* (2013.01); *G09G 2330/08* (2013.01); *G09G 2340/12* (2013.01)

(58) Field of Classification Search
CPC .. G09G 5/22; G09G 2330/08; G09G 2340/12; G09G 2380/12; G06F 3/013; G06F 3/147
USPC ........... 359/630–632; 345/7–9, 32, 156, 419, 345/426, 427, 582, 633; 351/209
See application file for complete search history.

(56) References Cited

U.S. PATENT DOCUMENTS

| | | | |
|---|---|---|---|
| 3,851,303 A | 11/1974 | Muller | |
| 3,885,095 A | 5/1975 | Wolfson et al. | |
| 3,940,204 A | 2/1976 | Withrington | |
| 4,082,432 A | 4/1978 | Kirschner | |
| 4,099,841 A | 7/1978 | Ellis | |
| 4,178,074 A | 12/1979 | Heller | |
| 4,218,111 A | 8/1980 | Withrington et al. | |
| 4,232,943 A | 11/1980 | Rogers | |
| 4,309,070 A | 1/1982 | St. Leger Searle | |
| 4,647,967 A | 3/1987 | Kirschner et al. | |
| 4,711,512 A | 12/1987 | Upatnieks | |
| 4,714,320 A | 12/1987 | Banbury | |
| 4,743,083 A | 5/1988 | Schimpe | |
| 4,749,256 A | 6/1988 | Bell et al. | |
| 4,775,218 A | 10/1988 | Wood et al. | |
| 4,799,765 A | 1/1989 | Ferrer | |
| 4,854,688 A | 8/1989 | Hayford et al. | |
| 4,928,301 A | 5/1990 | Smoot | |
| 4,946,245 A | 8/1990 | Chamberlin et al. | |
| 5,007,711 A | 4/1991 | Wood et al. | |
| 5,035,734 A | 7/1991 | Honkanen et al. | |
| 5,076,664 A | 12/1991 | Migozzi | |
| 5,079,416 A | 1/1992 | Filipovich | |
| 5,117,285 A | 5/1992 | Nelson et al. | |
| 5,124,821 A | 6/1992 | Antier et al. | |
| 5,148,302 A | 9/1992 | Nagano et al. | |
| 5,151,958 A | 9/1992 | Honkanen | |
| 5,153,751 A | 10/1992 | Ishikawa et al. | |
| 5,159,445 A | 10/1992 | Gitlin et al. | |
| 5,160,523 A | 11/1992 | Honkanen et al. | |
| 5,183,545 A | 2/1993 | Branca et al. | |
| 5,187,597 A | 2/1993 | Kato et al. | |
| 5,210,624 A | 5/1993 | Matsumoto et al. | |
| 5,218,360 A | 6/1993 | Goetz et al. | |
| 5,243,413 A | 9/1993 | Gitlin et al. | |
| 5,289,315 A | 2/1994 | Makita et al. | |
| 5,295,208 A | 3/1994 | Caulfield et al. | |
| 5,303,085 A | 4/1994 | Rallison | |
| 5,317,405 A | 5/1994 | Kuriki et al. | |
| 5,341,230 A | 8/1994 | Smith | |
| 5,351,151 A | 9/1994 | Levy | |
| 5,359,362 A | 10/1994 | Lewis et al. | |
| 5,363,220 A | 11/1994 | Kuwayama et al. | |
| 5,369,511 A | 11/1994 | Amos | |
| 5,400,069 A | 3/1995 | Braun et al. | |
| 5,408,346 A | 4/1995 | Trissel et al. | |
| 5,418,584 A | 5/1995 | Larson | |
| 5,438,357 A | 8/1995 | McNelley | |
| 5,455,693 A | 10/1995 | Wreede et al. | |
| 5,471,326 A | 11/1995 | Hall et al. | |
| 5,473,222 A | 12/1995 | Thoeny et al. | |
| 5,496,621 A | 3/1996 | Makita et al. | |
| 5,500,671 A | 3/1996 | Andersson et al. | |
| 5,510,913 A | 4/1996 | Hashimoto et al. | |
| 5,515,184 A | 5/1996 | Caulfield et al. | |
| 5,524,272 A | 6/1996 | Podowski et al. | |
| 5,532,736 A | 7/1996 | Kuriki et al. | |
| 5,537,232 A | 7/1996 | Biles | |
| 5,572,248 A | 11/1996 | Allen et al. | |
| 5,579,026 A | 11/1996 | Tabata | |
| 5,583,795 A * | 12/1996 | Smyth ................. | A61B 3/0025 359/630 |
| 5,604,611 A | 2/1997 | Saburi et al. | |
| 5,606,433 A | 2/1997 | Yin et al. | |
| 5,612,733 A | 3/1997 | Flohr | |
| 5,612,734 A | 3/1997 | Nelson et al. | |
| 5,619,254 A | 4/1997 | McNelley | |
| 5,629,259 A | 5/1997 | Akada et al. | |
| 5,631,107 A | 5/1997 | Tarumi et al. | |
| 5,633,100 A | 5/1997 | Mickish et al. | |
| 5,646,785 A | 7/1997 | Gilboa et al. | |
| 5,648,857 A | 7/1997 | Ando et al. | |
| 5,661,577 A | 8/1997 | Jenkins et al. | |
| 5,661,603 A | 8/1997 | Hanano et al. | |
| 5,665,494 A | 9/1997 | Kawabata et al. | |
| 5,668,907 A | 9/1997 | Veligdan | |
| 5,682,255 A | 10/1997 | Friesem et al. | |
| 5,694,230 A | 12/1997 | Welch | |
| 5,701,132 A | 12/1997 | Kollin et al. | |
| 5,706,108 A | 1/1998 | Ando et al. | |
| 5,707,925 A | 1/1998 | Akada et al. | |
| 5,724,189 A | 3/1998 | Ferrante | |
| 5,726,782 A | 3/1998 | Kato et al. | |
| 5,727,098 A | 3/1998 | Jacobson | |
| 5,729,242 A | 3/1998 | Margerum et al. | |
| 5,731,060 A | 3/1998 | Hirukawa et al. | |
| 5,731,853 A | 3/1998 | Taketomi et al. | |
| 5,742,262 A | 4/1998 | Tabata et al. | |
| 5,751,452 A | 5/1998 | Tanaka et al. | |
| 5,760,931 A | 6/1998 | Saburi et al. | |
| 5,764,414 A | 6/1998 | King et al. | |
| 5,790,288 A | 8/1998 | Jager et al. | |
| 5,812,608 A | 9/1998 | Valimaki et al. | |
| 5,822,127 A | 10/1998 | Chen et al. | |
| 5,841,507 A | 11/1998 | Barnes | |
| 5,856,842 A | 1/1999 | Tedesco | |
| 5,868,951 A | 2/1999 | Schuck et al. | |
| 5,892,598 A | 4/1999 | Asakawa et al. | |
| 5,898,511 A | 4/1999 | Mizutani et al. | |
| 5,903,395 A | 5/1999 | Rallison et al. | |
| 5,907,416 A | 5/1999 | Hegg et al. | |
| 5,907,436 A | 5/1999 | Perry et al. | |
| 5,917,459 A | 6/1999 | Son et al. | |
| 5,926,147 A | 7/1999 | Sehm et al. | |
| 5,929,946 A | 7/1999 | Sharp et al. | |
| 5,937,115 A | 8/1999 | Domash | |
| 5,942,157 A | 8/1999 | Sutherland et al. | |
| 5,945,893 A | 8/1999 | Plessky et al. | |
| 5,949,302 A | 9/1999 | Sarkka | |
| 5,966,223 A | 10/1999 | Friesem et al. | |
| 5,985,422 A | 11/1999 | Krauter | |
| 5,991,087 A | 11/1999 | Rallison | |
| 5,999,314 A | 12/1999 | Asakura et al. | |
| 6,042,947 A | 3/2000 | Asakura et al. | |
| 6,043,585 A | 3/2000 | Plessky et al. | |
| 6,075,626 A | 6/2000 | Mizutani et al. | |
| 6,078,427 A | 6/2000 | Fontaine et al. | |
| 6,115,152 A | 9/2000 | Popovich et al. | |
| 6,127,066 A | 10/2000 | Ueda et al. | |
| 6,137,630 A | 10/2000 | Tsou et al. | |
| 6,169,613 B1 | 1/2001 | Amitai et al. | |
| 6,176,837 B1 | 1/2001 | Foxlin | |
| 6,195,206 B1 | 2/2001 | Yona et al. | |
| 6,222,675 B1 | 4/2001 | Mall et al. | |
| 6,222,971 B1 | 4/2001 | Veligdan et al. | |
| 6,249,386 B1 | 6/2001 | Yona et al. | |
| 6,259,423 B1 | 7/2001 | Tokito et al. | |
| 6,259,559 B1 | 7/2001 | Kobayashi et al. | |
| 6,285,813 B1 | 9/2001 | Schultz et al. | |
| 6,317,083 B1 | 11/2001 | Johnson et al. | |

(56) References Cited

U.S. PATENT DOCUMENTS

| | | |
|---|---|---|
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,690,516 B2 | 2/2004 | Aritake et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,750,995 B2 | 6/2004 | Dickson |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |

(56) References Cited

U.S. PATENT DOCUMENTS

| | | |
|---|---|---|
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,447,365 B1 | 5/2013 | Imanuel |
| 8,472,119 B1 | 6/2013 | Kelly |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,659,826 B1 | 2/2014 | Brown et al. |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,886 B2 | 6/2014 | Gupta |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,830,588 B1 | 9/2014 | Brown et al. |
| 8,913,324 B2 | 12/2014 | Schrader |
| 8,938,141 B2 | 1/2015 | Magnusson |
| 8,964,298 B2 * | 2/2015 | Haddick ............... G06F 3/013 |
| | | 359/630 |
| 9,097,890 B2 | 8/2015 | Miller et al. |
| 9,244,280 B1 * | 1/2016 | Tiana ............... G02B 27/0172 |
| 9,456,744 B2 | 10/2016 | Popovich et al. |
| 2002/0012064 A1 | 1/2002 | Yamaguchi |
| 2002/0021461 A1 | 2/2002 | Ono et al. |
| 2002/0131175 A1 | 9/2002 | Yagi et al. |
| 2003/0030912 A1 | 2/2003 | Gleckman et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutherland et al. |
| 2004/0130797 A1 | 7/2004 | Leigh Travis |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0215244 A1 | 9/2006 | Yosha et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1 | 12/2006 | Mukawa |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |

(56) References Cited

U.S. PATENT DOCUMENTS

| | | |
|---|---|---|
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0235365 A1 | 9/2011 | McCollum et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0310356 A1 | 12/2011 | Vallius |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0224062 A1 | 9/2012 | Lacoste et al. |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0093893 A1 | 4/2013 | Schofield et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0184904 A1 | 7/2013 | Gadzinski |
| 2013/0200710 A1 | 8/2013 | Robbins |
| 2013/0249895 A1 | 9/2013 | Westerinen et al. |
| 2013/0250207 A1 | 9/2013 | Bohn |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0043689 A1 | 2/2014 | Mason |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2014/0300966 A1 | 10/2014 | Travers et al. |
| 2015/0010265 A1 | 1/2015 | Popovich et al. |
| 2015/0167868 A1 | 6/2015 | Boncha |
| 2015/0177688 A1 | 6/2015 | Popovich et al. |
| 2015/0277375 A1 | 10/2015 | Large et al. |
| 2015/0289762 A1 | 10/2015 | Popovich et al. |
| 2015/0316768 A1 | 11/2015 | Simmonds |
| 2016/0209657 A1 | 7/2016 | Popovich et al. |

FOREIGN PATENT DOCUMENTS

| | | |
|---|---|---|
| DE | 10 2006 003 785 | 7/2007 |
| EP | 0 822 441 | 2/1998 |
| EP | 2 110 701 | 10/2009 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2004-157245 | 6/2004 |
| JP | 2006-350129 A | 12/2006 |
| JP | 2007-219106 A | 8/2007 |
| WO | WO-99/52002 | 10/1999 |
| WO | WO-03/081320 A1 | 10/2003 |
| WO | WO-2006/002870 | 1/2006 |
| WO | WO-2007/130130 A2 | 11/2007 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

(56) References Cited

FOREIGN PATENT DOCUMENTS

OTHER PUBLICATIONS

Non-Final Office Action on U.S. Appl. No. 13/250,858, dated Mar. 18, 2016, 20 pages.
Amendment and Reply for U.S. Appl. No. 12/571,262, mail date Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras et al., Exit Pupil Expander with a Large Field of View Based on Diffractive Optics, Journal of the SID, 2009, 6 pages.
Ayras, et al., "Exit pupil expander with a large field of view based on diffractive optics", Journal of the Society for Information Display, 17/8, 2009, pp. 659-664.
Cameron, A., The Application of Holograhpic Optical Waveguide Technology to Q-Sight Family of Helmet Mounted Displays, Proc. of SPIE, vol. 7326, 7326OH-1, 2009, 11 pages.
Caputo, R. et al., Policryps Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action in U.S. Appl. No. 13/864,991, dated Apr. 2, 2015, 16 pages.
Final Office Action on U.S. Appl. No. 13/869,866 Dated Oct. 3, 2014, 17 pages.
Final Office Action on U.S. Appl. No. 13/250,858 Dated Feb. 4, 2015, 18 pages.
Final Office Action on U.S. Appl. No. 13/250,940 Dated Oct. 17, 2014, 15 pages.
Final Office Action on U.S. Appl. No. 13/892,026 Dated Apr. 3, 2015, 17 pages.
Final Office Action on U.S. Appl. No. 13/892,057 Dated Mar. 5, 2015, 21 pages.
Final Office Action on U.S. Appl. No. 14/038,400 Dated Aug. 10, 2015, 32 pages.
First office action received in Chinese patent application No. 201380001530.1, dated Jun. 30, 2015, 9 pages with English translation.
International Preliminary Report on Patentability for PCT Application No. PCT/US2013/038070, dated Oct. 28, 2014, 6 pages.
International Search Report and Written Opinion regarding PCT/US2013/038070, mail date Aug. 14, 2013, 14 pages.
Irie, Masahiro, Photochromic diarylethenes for photonic devices, Pure and Applied Chemistry, 1996, pp. 1367-1371, vol. 68, No. 7, IUPAC.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/869,866 Dated Jul. 22, 2015, 28 pages.
Non-Final Office Action on U.S. Appl. No. 13/892,026 Dated Aug. 6, 2015, 22 pages.
Non-Final Office Action on U.S. Appl. No. 13/892,057 dated Jul. 30, 2015, 29 pages.
Non-Final Office Action on U.S. Appl. No. 13/250,858 dated Jun. 12, 2015, 20 pages.
Non-Final Office Action on U.S. Appl. No. 13/250,858 Dated Sep. 15, 2014, 16 pages.
Non-Final Office Action on U.S. Appl. No. 13/250,940 Dated Mar. 18, 2015, 17 pages.
Non-Final Office Action on U.S. Appl. No. 13/432,662 Dated May 27, 2015, 15 pages.
Non-Final Office Action on U.S. Appl. No. 13/844,456 Apr. 1, 2015, 16 Pages.
Non-Final Office Action on U.S. Appl. No. 13/864,991 Dated Oct. 22, 2014, 16 pages.
Non-Final Office Action on U.S. Appl. No. 13/869,866 Dated May 28, 2014, 16 pages.
Non-Final Office Action on U.S. Appl. No. 14/038,400 Dated Feb. 5, 2015, 18 pages.
Non-Final Office Action on U.S. Appl. No. 14/044,676 Dated Apr. 9, 2015, 13 pages.
Non-Final Office Action on U.S. Appl. No. 14/109,551 Dated Jul. 14, 2015, 32 pages.
Non-Final Office Action on U.S. Appl. No. 14/152,756, mail date Aug. 25, 2015, 39 pages.
Non-Final Office Action on U.S. Appl. No. 14/168,173 Dated Jun. 22, 2015, 14 pages.
Non-Final Office Action on U.S. Appl. No. 14/225,062 Dated May 21, 2015, 11 pages.
Nordin, G., et al., "Diffraction properties of stratified volume holographic optical elements," Journal of the Optical Society of America A., vol. 9, No. 12, Dec. 1992, pp. 2206-2217, 12 pages.
Notice of Allowance for U.S. Appl. No. 12/700,557, mail date Oct. 22, 2013, 9 pages.
Notice of Allowance on U.S. Appl. No. 13/250,970 dated Sep. 16, 2014, 7 pages.
Notice of Allowance on U.S. Appl. No. 13/251,087 Dated Jul. 17, 2014, 8 pages.
Notice of Allowance on U.S. Appl. No. 13/355,360 Dated Apr. 10, 2014, 7 pages.
Notice of Allowance on U.S. Appl. No. 14/038,400, dated Oct. 30, 2015, 9 pages.
Notice of Allowance on U.S. Appl. No. 14/225,062, dated Dec. 2, 2015, 10 pages.
Office Action for U.S. Appl. No. 12/571,262, mail date Sep. 28, 2011, 5 pages.
Office Action for U.S. Appl. No. 12/700,557, mail date Aug. 9, 2013, 12 pages.
Office Action for U.S. Appl. No. 12/700,557, mail date Feb. 4, 2013, 11 pages.
Office Action for U.S. Appl. No. 13/250,621, mail date May 21, 2013, 10 pages.
Office Action for U.S. Appl. No. 13/250,858 Dated Feb. 19, 2014, 13 pages.
Office Action for U.S. Appl. No. 13/250,858 mail date Feb. 19, 2014, 13 pages.
Office Action for U.S. Appl. No. 13/250,858, mail date Oct. 28, 2013, 9 pages.
Office Action for U.S. Appl. No. 13/250,940, mail date Aug. 28, 2013, 15 pages.
Office Action for U.S. Appl. No. 13/250,940, mail date Mar. 12, 2013, 11 pages.
Office Action for U.S. Appl. No. 13/250,970, mail date Jul. 30, 2013, 4 pages.
Office Action for U.S. Appl. No. 13/250,994, mail date Sep. 16, 2013, 11 pages.
Office Action for U.S. Appl. No. 13/355,360, mail date Sep. 12, 2013, 7 pages.
Office Action on U.S. Appl. No. 13/250,940 Dated Mar. 25, 2014, 12 pages.
Office Action on U.S. Appl. No. 13/251,087 Dated Mar. 28, 2014, 12 pages.
Office Action on U.S. Appl. No. 13/892,026 Dated Dec. 8, 2014, 19 pages.
Office Action on U.S. Appl. No. 13/892,057 Dated Nov. 28, 2014, 17 pages.
Office Action, USPTO, U.S. Appl. No. 10/696,507, mailed on Nov. 13, 2008, 15 pages.
Plastic has replaced glass in photochromic lens, www.plastemart.com, 2003, 1 page.
Press Release, "USAF Awards SBG Labs an SBIR Contract for Wide Field of View HUD", SBG Labs—DigiLens, Apr. 2013, 1 page.

(56) References Cited

OTHER PUBLICATIONS

Press Release: "Navy awards SGB Labs a contract for HMDs for simulation and training", Press releases, DigiLens, Oct. 2012, pp. 1-2, retrieved from the internat at http://www.digilens.com/pr10-2012.2.php. 2 pages.
Press Release: "Navy awards SGB Labs a contract for HMDs for simulation and training", Press releases, DigiLens, Oct. 2012, pp. 1-2, retrieved from the internet at http://www.digilens.com/pr10-2012.2.php. 2 pages.
Requirement for Restriction/Election on U.S. Appl. No. 13/844,456 Dated Sep. 12, 2014, 23 pages.
Restriction Requirement for U.S. Appl. No. 12/700,557, mail date Oct. 17, 2012, 5 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Webster's Third New International Dictionary 433 (1986), 3 pages.
Wisely, P.L., Head up and head mounted display performance improvements through advanced techniques in the manipulation of light, Proc. of SPIE vol. 7327, 732706-1, 2009, 10 pages.
Chinese Office Action issued in corresponding application No. 201310557623, dated Jan. 17, 2017, 10 pages.
Final Office Action on U.S. Appl. No. 14/152,756, dated Oct. 12, 2016, 18 pages.
Non-Final Office Action on U.S. Appl. No. 13/844,456, dated Dec. 29, 2016, 24 pages.
Non-Final Office Action on U.S. Appl. No. 13/844,456, with English translation, dated Dec. 29, 2016, 24 pages.
Non-Final Office Action on U.S. Appl. No. 14/044,676, dated Dec. 29, 2016, 26 pages.
Notice of Allowance on U.S. Appl. No. 13/892,057, dated Nov. 8, 2016, 10 pages.
Notice of Reasons for Rejection for Japanese Application No. 2015-509120, dated Nov. 1, 2016, 4 pages.
Notice of Allowance on U.S. Appl. No. 14/820,237, dated Jan. 23, 2017, 10 pages.
U.S. Appl. No. 14/814,020, filed Jul. 30, 2015, Brown et al.
Extended European Search Report for European Application No. 13765610.4 dated Feb. 16, 2016, 6 pages.
Final Office Action on U.S. Appl. No. 13/250,858, dated Jul. 11, 2016, 21 pages.
Final Office Action on U.S. Appl. No. 13/864,991, dated Jun. 27, 2016, 16 pages.
Final Office Action on U.S. Appl. No. 14/044,676, dated Aug. 12, 2016, 23 pages.
Final Office Action on U.S. Appl. No. 14/168,173, dated Nov. 4, 2015, 10 pages.
Final Office Action on U.S. Appl. No. 14/260,943, dated Jul. 19, 2016, 23 pages.
Non-final Office Action on U.S. Appl. No. 13/250,858, dated Nov. 14, 2016, 18 pages.
Non-Final Office Action on U.S. Appl. No. 13/844,456, dated Aug. 16, 2016, 18 pages.
Non-Final Office Action on U.S. Appl. No. 13/844,456, dated Jan. 15, 2016, 16 Pages.
Non-Final Office Action on U.S. Appl. No. 13/864,991 dated Nov. 30, 2015, 18 pages.
Non-Final Office Action on U.S. Appl. No. 13/892,026 dated Mar. 22, 2016, 16 pages.
Non-Final Office Action on U.S. Appl. No. 13/892,057, dated May 16, 2016, 23 pages.
Non-Final Office Action on U.S. Appl. No. 14/044,676, dated Jan. 20, 2016, 21 pages.
Non-Final Office Action on U.S. Appl. No. 14/168,173 dated Mar. 10, 2016, 9 pages.
Non-Final Office Action on U.S. Appl. No. 14/260,943 dated Feb. 3, 2016, 19 pages.
Non-Final Office Action on U.S. Appl. No. 14/465,763, dated Sep. 29, 2016, 4 pages.
Non-Final Office Action on U.S. Appl. No. 14/497,280, dated Sep. 22, 2016, 15 pages.
Non-Final Office Action on U.S. Appl. No. 14/820,237, dated Aug. 5, 2016, 14 pages.
Notice of Allowance on U.S. Appl. No. 13/432,662, dated Feb. 18, 2016, 10 pages.
Notice of Allowance on U.S. Appl. No. 13/892,026, dated Jul. 18, 2016, 10 pages.
Notice of Allowance on U.S. Appl. No. 14/814,020, dated Aug. 12, 2016, 15 pages.
Final Office Action on U.S. Appl. No. 14/152,756, dated Jun. 7, 2017, 16 pages.
Non-Final Office Action on U.S. Appl. No. 14/754,368, dated May 8, 2017, 12 pages.
Non-Final Office Action on U.S. Appl. No. 15/136,841, 12 pages, dated Jul. 13, 2017.

* cited by examiner

NEAR EYE DISPLAY SYSTEM AND METHOD FOR DISPLAY ENHANCEMENT OR REDUNDANCY

CROSS REFERENCE TO RELATED APPLICATIONS

The present application is a continuation of U.S. patent application Ser. No. 14/225,062 entitled "Near Eye Display System and Method For Display Enhancement or Redundancy," filed on Mar. 25, 2014, now U.S. Pat. No. 9,244,280, which is incorporated by reference in its entirety and for all purposes.

The present application is related to U.S. patent application Ser. No. 14/038,400 entitled "Display System and Method Using a Detached Combiner," filed on Sep. 26, 2013, now U.S. Pat. No. 9,244,281, U.S. patent application Ser. No. 14/152,756, entitled, "Near Eye Display System and Method With Fixed Combiner," filed on Jan. 10, 2014, U.S. patent application Ser. No. 12/700,557, entitled, "Worn Display System and Method Without Requiring Real Time Tracking For BoreSight Precision," filed on Feb. 4, 2010, now U.S. Pat. No. 8,659,826, incorporated herein by reference in its entirety, and assigned to the assignee of the present application, U.S. patent application Ser. No. 13/250,621, entitled, "System For and Method of Catadioptric Collimation In a Compact Head Up Display (HUD)," filed on Sep. 30, 2011, now U.S. Pat. No. 8,634,139, incorporated herein by reference in its entirety and assigned to the assignee of the present application, U.S. patent application Ser. No. 13/250,940, entitled, "Head Up Display (HUD) Utilizing Diffractive Gratings Having Graded Efficiency," filed on Sep. 30, 2011, now abandoned, incorporated herein by reference in its entirety, and assigned to the assignee of the present application; U.S. patent application Ser. No. 13/250,858, entitled, "Ultra-Compact HUD Utilizing Waveguide Pupil Expander With Surface Relief Gratings In High Refractive Index Materials," filed on Sep. 30, 2011, incorporated herein by reference in its entirety, and assigned to the assignee of the present application; U.S. patent application Ser. No. 13/251,087, entitled, "System for and Method of Extending Vertical Field of View in Head Up Display Utilizing a Waveguide Combiner," filed on Sep. 30, 2011, now U.S. Pat. No. 8,903,207, incorporated herein by reference in its entirety, and assigned to the assignee of the present application; U.S. patent application Ser. No. 13/250,970, entitled, "System For and Method of Stowing HUD Combiners," filed on Sep. 30, 2011, now U.S. Pat. No. 8,937,772, and assigned to the assignee of the present application, incorporated herein by reference in its entirety; and U.S. patent application Ser. No. 13/250,994, entitled, "Compact Head Up Display (HUD) for Cockpits with Constrained Space Envelopes," filed on Sep. 30, 2011, now U.S. Pat. No. 8,749,890, incorporated herein by reference herein in its entirety and assigned to the assignee of the present application.

BACKGROUND

The present specification relates generally to the field of displays. More specifically, the specification relates to virtual displays.

Virtual displays can provide information that is viewable in virtual space for a user of equipment, such as aircraft, ships, boats, naval craft, medical equipment, robotic equipment, remote vehicles, unmanned vehicle systems (UVSs), training simulators, entertainment systems, military equipment, land vehicles, etc. The information can include navigation parameters, guidance parameters, equipment parameters, location information, video information, remote views, symbology, etc.

Virtual displays can be Near Eye Displays (NEDs), such as Head Mounted Displays (HMDs) (e.g., head worn displays, helmet mounted displays and head worn displays) or Head Up Displays (HUDs) with a fixed combiner near the eye position. Virtual displays can be utilized to provide images to an operator or user (e.g., a pilot in a cockpit). In aircraft applications, HUDs generally include a fixed combiner, an optical projector, an image source, and a HUD computer. HMDs generally include a head worn or helmet mounted combiner, optical projection elements, an image source, a HMD computer, and a head orientation sensor. The HUD or HMD computer causes the image source to provide an image which is projected to a combiner. The combiner provides a collimated image to the pilot. The image can include enhanced vision images, flight symbology, targeting data, flight instrument data, synthetic vision images, head up display (HUD) data, etc.

Cockpit and other display technologies have utilized non-virtual displays such as gauges and panel displays (e.g., head down displays (HDDs) in the cockpit environment). The non-virtual display technology has migrated from a multiplicity of independent gauges to a few large panel, non-virtual displays (e.g., large format HDDs in the cockpit environment). The large format HDDs can represent and concentrate information that used to be apportioned to different gauges and smaller HDDs. While this display technology allows for denser and more flexible display of multiple information streams, the denser, larger display formats can present several drawbacks. First, as information density on each panel is increased, the failure of a single display panel can cause degradation in cockpit workflow, pilot workload, and the amount of information provided to the pilot. Second, the larger, denser displays cannot easily direct attention to particular warnings on the HDDs and/or to locations outside of the cockpit and/or off the HDDs. Third, larger displays cannot be designed to cover the entire cockpit area. Dead space or unused areas in the cockpit cannot be filled in with display information due to shape and size constraints. Large HDDs often include bezels which take up space in the cockpit and cannot display information for the pilot. Bezels associated with conventional HDDs can prevent a seamless display experience.

Thus, there is a need for a low cost, lightweight virtual display system for use with a heads down display (HDD). There is also a need for a virtual display system that provides a seamless display system. There is further a need for near eye display system and method that can be easily integrated in the design of a cockpit without requiring extra display space. There is further a need for a near eye display that can provide display redundancy in the event of a malfunction. There is also a need for a virtual display system and method that is optimized to direct attention to warnings in the cockpit or to locations outside of the cockpit. Yet further, there is a need for a near eye display system that displays types of information in positions that are appropriate for the particular type of information.

Accordingly, it would be desirable to provide a display system and/or method that provides one or more of these or other advantageous features. Other features or advantages will be made apparent in the present specification. The teachings disclosed extend to those embodiments which fall within the scope of the appended claims, regardless of whether they accomplish one or more of the aforementioned advantages or features.

SUMMARY

An exemplary embodiment relates to an apparatus for providing a virtual display in an environment. The apparatus includes a number of head down image sources. The head down image sources are each disposed at a respective image source position and separated by a gap. The apparatus also includes a combiner configured to provide an image. The image being provided virtually at a location associated with the gap.

Another exemplary embodiment relates to an apparatus for providing a virtual display in an environment including at least one head down image source. The apparatus includes a computer and a combiner configured to provide an image in response to the computer. The image is associated with the image source when the image source is in a failed mode.

Another exemplary embodiment relates to an HMD or HUD for providing a virtual display in an environment. The HMD or HUD includes at least one head down image source, and a combiner. The combiner is configured to provide an image. The image is provided to replace an image associated with the image source. The image is provided when the image source is in a failed mode.

Another exemplary embodiment relates to an apparatus in an environment. The environment includes a number of image sources. The image sources are each disposed at a respective image source position and are separated by a gap. The apparatus includes an image source and a combiner. The combiner is configured to provide an image from the image source. The image is provided virtually at a location associated with the gap.

Another exemplary embodiment relates to an apparatus that includes a near-eye display system including an image source and a combiner. The image source provides an image on the combiner for directing the attention of the user to a display or instrument in the field of view.

Other exemplary embodiments relate to methods for performing the operations associated with the systems and apparatuses described above.

BRIEF DESCRIPTION OF THE DRAWINGS

These and other features, aspects, and advantages of the present invention will become apparent from the following description, appended claims, and the accompanying exemplary embodiments shown in the drawings, wherein like numerals denote like elements, which are briefly described below:

DETAILED DESCRIPTION

Figure 1:
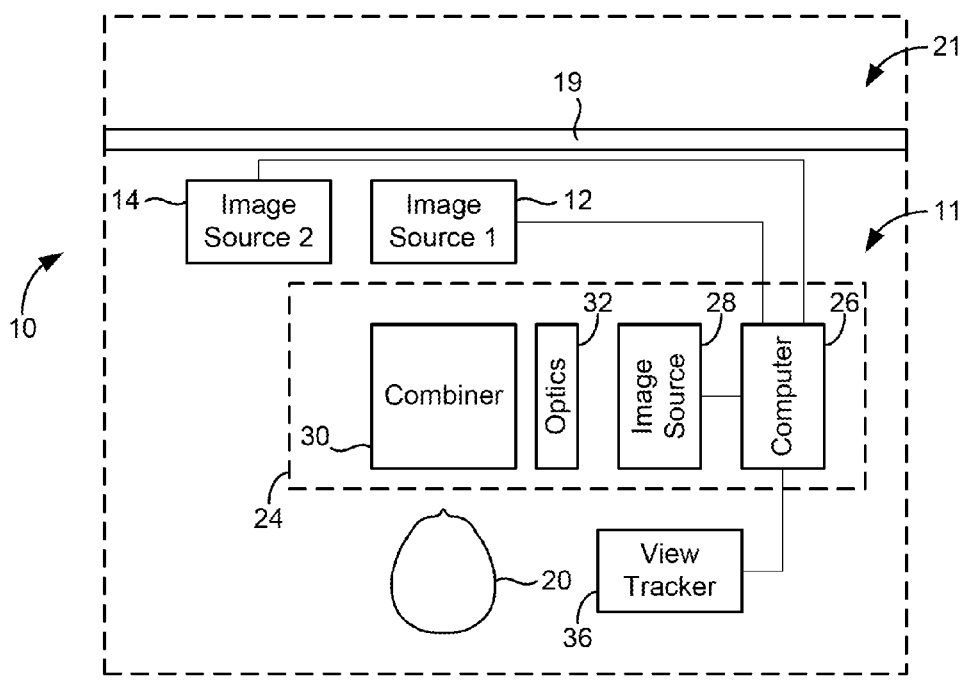
FIG. 1 is a schematic general block diagram of a virtual display system including a near eye combiner in accordance with an exemplary embodiment.

Before describing in detail the particular improved system and method, it should be observed that the invention includes, but is not limited to, a novel structural combination of components and not in the particular detailed configurations thereof. Accordingly, the structure, software, optics, methods, functions, control and arrangement of components have been illustrated in the drawings by readily understandable block representations and schematic drawings in order not to obscure the disclosure with structural details which will be readily available to those of ordinary skill in the art having the benefit of the description herein. Further, the invention is not limited to the particular embodiments depicted in the exemplary diagrams, but should be construed in accordance with the language of the claims.

With reference to FIG. 1, a virtual display system 10 provides a virtual image at one or more locations in an environment 11. System 10 can be part of a head up display (HUD) system, a head worn display system, a helmet mounted display (HMD) system, or other worn display system. Virtual display system 10 can be utilized in various applications, including but not limited to aviation, medical, naval, targeting, ground-based vehicle, military, remote control, etc. In one embodiment, virtual display system 10 is configured for use in smaller cockpit embodiments, for use in remote vehicle or aircraft applications, for use in ships or boats, or for use in simulators or other training devices. System 10 can be utilized for two dimensional or three dimensional virtual images.

Virtual system 10 is disposed in environment 11 which can be a cockpit, bridge, operating room, etc. Environment 11 can have a window 19 or port to an environment 21 external to environment 11 in one embodiment. For example, environment 11 can be an aircraft cockpit, and environment 21 can be the real world viewable through the windshield canopy of the cockpit. In one embodiment, environment 11 is a windowless cockpit environment.

In one embodiment, system 10 can include image source 12, image source 14, and a Near-Eye Display (NED) system 24. Image source 12 and image source 14 can be head down displays (HDDs) in a cockpit environment in one embodiment. Image sources 12 and 14 can be liquid crystal displays, CRT displays, gauges, etc. In one embodiment, image sources 12 and 14 are large format displays covering a portion of the cockpit environment. Dead spaces and gaps where sources 12 and 14 are not located are present in the cockpit environment in one embodiment.

Near eye display system 24 provides at least one virtual image in one embodiment. Near eye display system 24 can be a head worn display system or a fixed combiner display system in certain embodiments. In one embodiment, the virtual image replaces, augments, and/or complements an image provided by at least one of sources 12 and 14.

Near eye display system 24 includes a computer 26, an image source 28, optics 32 and a combiner 30. Images from image source 28 are projected via optics 32 to combiner 30 which can be a head worn combiner or a fixed combiner in one embodiment. System 10 can include a view tracker 36 for providing gaze information associated with the user (e.g., pilot) to computer 26 in one embodiment.

In operation, near eye display system 24 provides images from image source 28 to a pilot or other operator so that he or she can simultaneously view the images and a real world scene in one embodiment. The images can include graphic and/or text information (e.g., flight path vector, target icons, symbols, fuel indicators, course deviation indicator, pitch indicator, etc.). The image can also include information from other sensors or equipment associated with environment 10 (e.g., a vertical traffic collision avoidance display, terrain avoidance and awareness display, a weather radar display, flight control sensors, an electronic flight bag, a navigation system, environmental sensors, etc. in an aircraft) in one embodiment. In addition, the images can include synthetic or enhanced vision images. In one embodiment, collimated light representing the image from image source 28 is provided on combiner 30 so that the pilot can view the image conformally on the real world scene through combiner 30.

Near eye display system 24, with or without view tracker 36, can be used to compensate for the partial or total failure of one or more head-down displays (e.g., sources 12 and 14) in one embodiment. When computer 26 receives an indication of malfunction associated with one of sources 12 or 14, computer 26 can cause information associated with the malfunctioning display (e.g. source 12 or 14) to be displayed on combiner 30. The indication of the malfunction or display fault can be provided from sources 12 or 14 or other systems including an integrated display control and monitoring system in one embodiment. In one embodiment, the indication can be manually input via a user interface. When computer 26 receives the indication of malfunction associated with both sources 12 and 14, computer 26 can cause information associated with the malfunctioning sources 12 and 14 to be displayed on combiner 30. The information associated with both sources 12 and 14 can be merged and redundant information eliminated to more clearly display the information. Near eye display system 24 can also provide information from malfunctioning gauges or other equipment when an indication of a fault or malfunction is received by computer 26 in one embodiment.

In one embodiment, upon failure of sources 12 or 14, which can be automatically detected or manually indicated, computer 26 instructs system 24 to display to the pilot the content of the failed source 12 or 14 or both whenever the pilot looks in the direction of the failed display in one embodiment. Computer 26 can use gaze information from view tracker 36 to determine when the pilot views the failed source 12 or 14 in one embodiment. In one embodiment, the field of view previously subtended by the failed source 12 or 14 is now filled by system 24, which now acts as a backup or redundant display system. Advantageously, system 24 leads to seamless continuation of cockpit operations and improved dispatch reliability for the aircraft in one embodiment.

In one embodiment, the HDDs (sources 12 and 14) are non-functional and simply are a target area so that when the user looks at the target area, information associated with the target area is provided. In this way, system 24 operates to provide a virtual head down display system according to one embodiment.

In one embodiment, near eye display system 24 can be used to enhance the awareness of information provided by sources 12 and 14 and to enhance awareness of aircraft operations. For example, indications can be displayed by system 24 (which is always within the wearer's field of view (FOV) in one embodiment) to direct the attention of user 20 to particular locations within the cockpit (warning messages on sources 12 and 14, or other instruments) or outside the cockpit (e.g., for traffic etc.). In one embodiment, arrows, chevrons, text or other indicia are provided on combiner 30 to direct the pilot's attention. Computer 26 can receive gaze information from tracker 36 and adjust the position of the arrow or other indicia as the pilot's view changes toward the warning message or traffic in one embodiment. Color can be added to or overlayed over monochromatic information provided by sources 12 and 14 using combiner 30 to augment the display of information in one embodiment.

In another embodiment, system 24 can be used to "fill in" the dead spaces in environment 11 associated with sources 12 and 14. The dead spaces can be associated with bezels or areas between sources 12 and 14 in one embodiment. The dead spaces or unused areas can also be located above, below, to the right, or to the left of sources 12 and 14 in one embodiment. Advantageously, system 24 provides information at locations where placement of displays is impracticable (e.g., due to non-rectangular or non-planar areas, or other areas not meeting the requirements of the display device installation) in one embodiment.

In addition, near eye display system 24 can provide information at locations between sources 12 and 14 to virtually provide the appearance of a seamless display in one embodiment. Eliminating display seams is advantageous when providing information that requires spanning multiple sources 12 and 14, for example wide field of view imagery, large maps, etc. according to one embodiment. System 24 can provide information to gaps between sources 12 and 14 to provide a seamless display experience in one embodiment. Computer 24 can use gaze information from tracker 36 to appropriately provide the information in virtual locations associated with dead spaces in the cockpit. In addition, HUD symbology can be provided when user 20 looks through combiner 30 through window 19 in one embodiment.

View tracker 36 is an optional component of system 24 in one embodiment. View tracker 36 can include sensors for head tracking and/or pupil tracking. In one embodiment, an eye sensor which picks up reflections of a pupil can be utilized for tracking position of the eye. Head position and pupil position from tracker 36 can be provided as gaze information to computer 26 so computer 26 can determine an appropriate virtual image for the pilot.

In one embodiment, view tracker 36 can be or include one or more camera-based sensors to provide gaze information. The cameras can be mounted on system 24 or the user for determining the content of the user's visual field (e.g., gaze information). The camera can be part of head tracker 36. In one embodiment, the camera associated with head tracker 36 can utilize marks within environment 11 to determine where user 20 is looking. Spatial registry software can be utilized to determine where a user is viewing.

Combiner 30 can be embodied as a head worn combiner or a fixed HUD combiner. In one embodiment, combiner 30 utilizes waveguide optics and diffraction gratings to receive collimated light provided by source 28 and provide collimated light to a user 20. In one embodiment, combiner 30 can be a goggle, glasses, helmet or visor-type combiner.

Image sources 12, 14, and 28 can be or include any type of devices for providing an image including but not limited to a CRT display, an LED display, an active matrix liquid crystal display (LCD), a light emitting diode, laser illuminator, etc. In one embodiment, image source 28 can be a micro LCD assembly or liquid crystal on silicon (LCOS) display and can provide linearly polarized light. Image source 28 can include a laser or LED backlight in one embodiment.

Image sources 12, 14 and 28 can provide information from a variety of sources. In one embodiment, image sources 12 and 14 can provide information from aircraft sensors, instruments, and systems including but not limited to one or more of a targeting computer, a HUD computer, a synthetic vision system (SVS), an enhanced vision system (EVS), a flight computer, a traffic collision avoidance system (TCAS), a terrain awareness and avoidance system (TAAS), a navigation system, an electronic flight bag system and a HUD/HWD computer.

Computer 26 can be a HUD computer or HWD computer and controls the provision of images by image source 28. Computer 26 can be a processing circuit or part of a processing circuit associated with other electronic components in environment 11. Computer 26 can receive data from various sensors, equipment, and subsystems and can receive data from image sources 12 and 14. For example, image sources 12 and 14 can provide an indication of a malfunction to computer 26.

Optics 32 can be collimating optics which can be a single optical component, such as a lens, or include multiple optical components. The collimating optics can be integrated with image source 28 in one embodiment. The collimating optics can also be separate or partially separate from image source 28.

Figure 2:
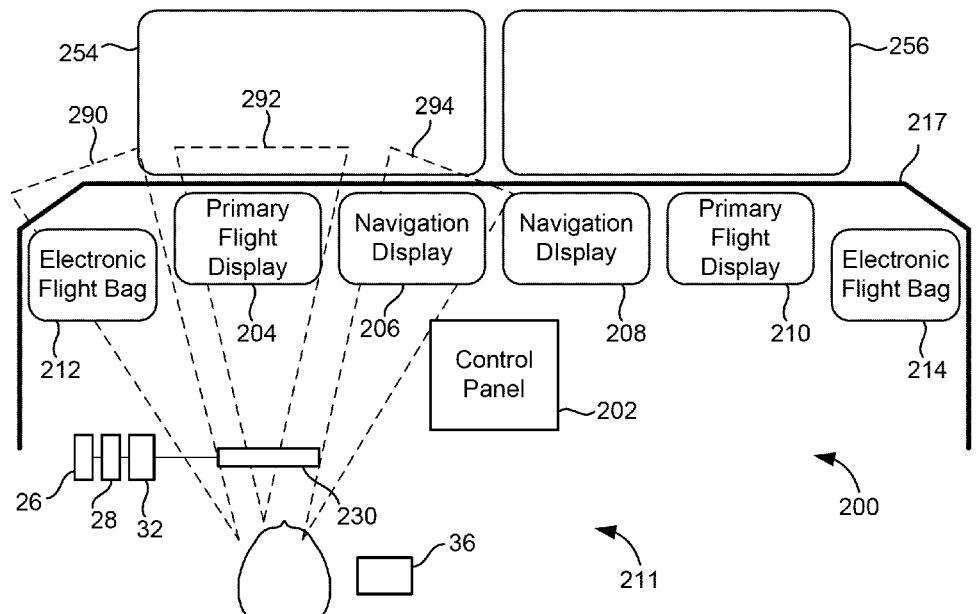
FIG. 2 is a more detailed block diagram of the virtual display system illustrated in FIG. 1, including a near eye waveguide combiner in accordance with another exemplary embodiment.

With reference to FIG. 2, a display system 200 similar to display system 10 includes a combiner 230, optics 32, image source 28 and HUD computer 26. Combiner 230 is preferably a waveguide fixed combiner with a diffractive grating input and a diffractive grating output. Combiner 230 can disposed near the pilot's eyes as described in U.S. patent application Ser. No. 14/152,756 according to one embodiment. Combiner 230 can be flat or curved.

System 200 is employed in an aircraft environment 211 or a cockpit including a window 254 and a window 256 in one embodiment. In addition, environment 211 can include a control panel 202, a primary flight display 204, a navigation display 206, a navigation display 208, a primary flight display 210, an electronic flight bag display 212 and electronic flight bag display 214 each can be an HDD or part of an HDD in one embodiment. In one embodiment displays 204, 206, and 212 are provided on a single large panel HDD or a pair of HDDs. Primary flight display 210, a navigation display 208, and electronic flight bag display 214 can be redundant systems provided for a co-pilot, as shown in FIG. 2 according to one embodiment.

In operation, when the pilot's view 294 through combiner 230 is toward display 206, computer 26 causes image source 28 to provide information to combiner 230 that augments or replaces the information on display 206. The information can point to or highlight warnings on display 206 or off display 206 in one embodiment. In one embodiment, the information can replace the navigation display information on navigation display 206 when display 206 fails. In one embodiment, the information can fill in dead spaces near display 206 or between displays 204 and 206. A HUD computer 26 can provide the data for the image on source 28 using gaze information from view tracker 36 in one embodiment.

Pilot 220 can turn or rotate head position to view information on combiner 230 associated with primary flight display 204 according to view 292. Display 212 can provide electronic flight bag information. Pilot 220 can turn or rotate head position to view information on combiner 230 associated with display 212 according to view 290. Combiner 230 can augment or replace information on displays 212 and 204 in a similar manner to the augmentation and replacement described above with respect to display 206.

Although only three displays 212, 204, and 206 for a pilot are shown in FIG. 2, more image sources and fields of view can be provided. Displays 212, 204, and 206 can be provided below a glare shield 217 in one embodiment.

Figure 3:
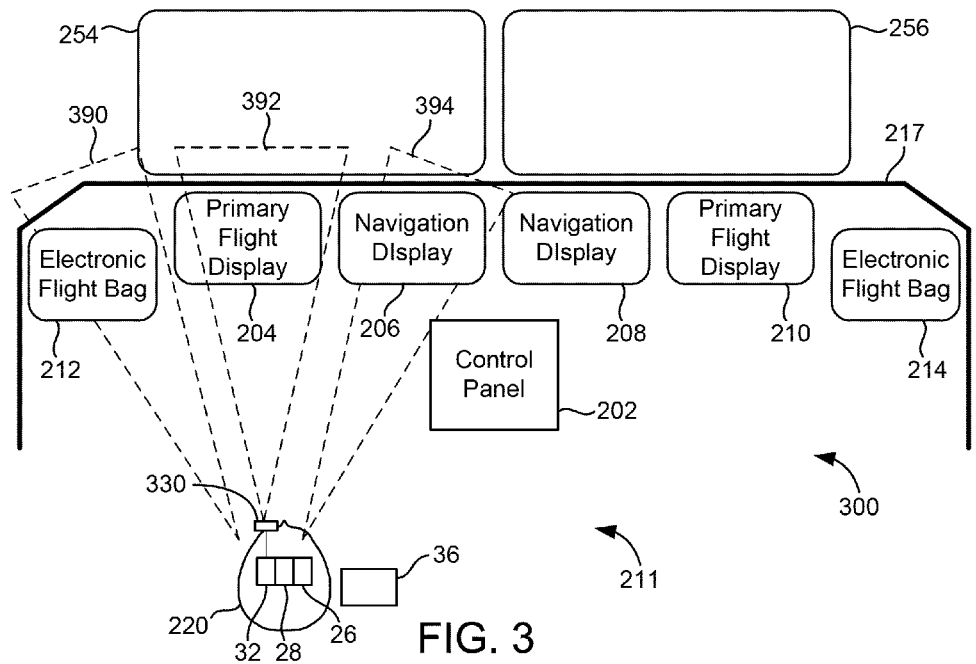
FIG. 3 is a more detailed block diagram of the virtual display system illustrated in FIG. 1, including a near eye head worn combiner in accordance with another exemplary embodiment.

With reference to FIG. 3, a display system 300 similar to display system 10 includes a head worn combiner 330, optics 32, image source 28 and HWD computer 26 similar to computer 26. Combiner 330 can be a binocular or monocular combiner. Combiner 330 can be a substrate waveguide combiner with a diffractive grating input and a diffractive grating output in one embodiment. Combiner 330 can be provided on frames for glasses in one embodiment.

System 300 is employed in an aircraft environment 211 or a cockpit including a window 254 and a window 256 in one embodiment. In addition, environment 211 can include a control panel 202, a primary flight display 204, a navigation display 206, a navigation display 208, a primary flight display 210, an electronic flight bag display 212 and electronic flight bag display 214, each can be an HDD or part of an HDD in one embodiment. In one embodiment displays 204, 206, and 212 are provided on a single large panel HDD or a pair of HDDs. Primary flight display 210, a navigation display 208, and electronic flight bag display 214 can be redundant systems provided for a co-pilot, as shown in FIG. 3 according to one embodiment.

In operation, when the pilot's view 392 through combiner 330 is toward display 204, computer 26 causes image source 28 to provide information to combiner 330 that augments or replaces the information on display 204. The information can point to or highlight warnings on display 204 or off display 204 in one embodiment. In one embodiment, the information can replace the primary flight display information on primary flight display 204 when display 204 fails. In one embodiment, the information can fill in dead spaces near display 204 or between displays 206 and 204 or displays 212 and 204. HWD computer 26 can provide the data for the image on source 28 using gaze information from view tracker 36 in one embodiment.

Pilot 220 can turn or rotate head position to view information on combiner 330 associated with navigation display 206 according to view 394. Display 212 can provide electronic flight bag information. Pilot 220 can turn or rotate head position to view information on combiner 330 associated with display 212 according to view 390. Combiner 330 can augment or replace information on displays 212 and 206 in a similar manner to the augmentation and replacement described above with respect to display 204. Although only three pilot displays 212, 204, and 206 are shown in FIG. 3, more image sources and fields of view can be provided.

Figure 4:
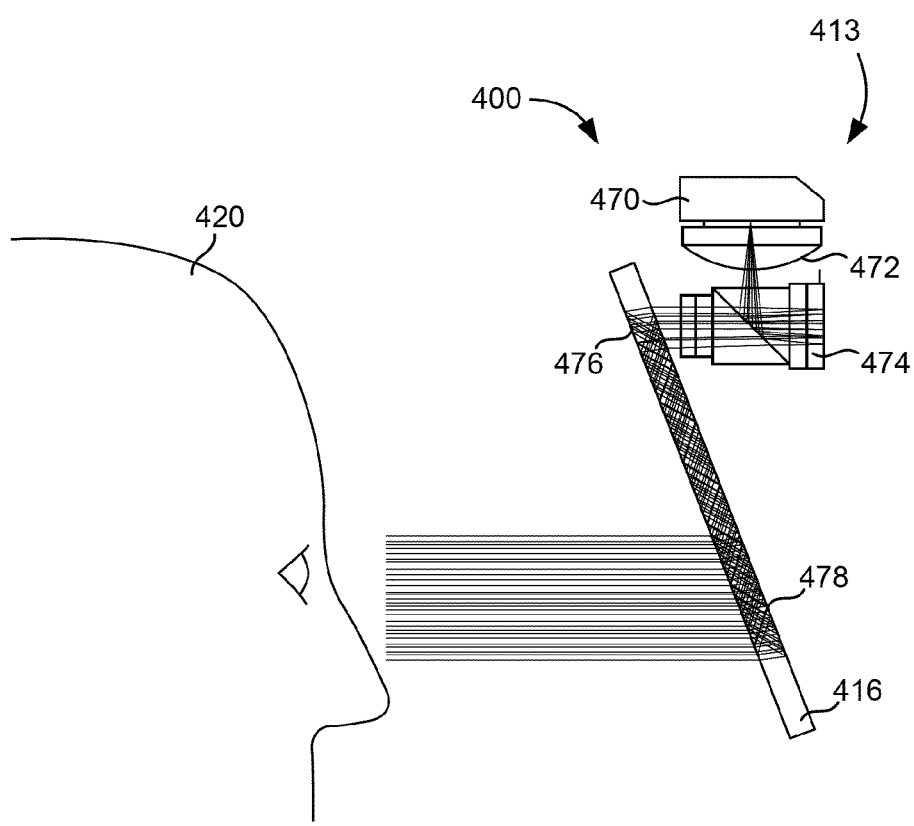
FIG. 4 is a side view schematic illustration of an exemplary image source and near eye combiner for the virtual display system illustrated in FIG. 2 in accordance with another exemplary embodiment.

With reference to FIG. 4, a display system 400, similar to NED system 24, is configured for use in a cockpit environment 411. Display system 400 includes a HUD combiner 416 and an image source 413. Image source 413 includes a backlit liquid crystal display module 470 including a transmissive AMLCD display A very compact optical system 474 receives light from lens 472 and provides collimated light to combiner 416 (e.g., collimation via a catadioptric folded collimator in one embodiment). Generally, the collimated light input to combiner 416 has a small dimension in a vertical direction allowing a compact design. Combiner 416 includes a diffractive grating 476 for coupling light into the waveguide associated with combiner 416 and a diffractive grating 478 that ejects light out of combiner 416 to pilot 420. Gratings 476 and 478 are configured for pupil expansion. Image source 413 and combiner 416 can be attached to a ceiling of the cockpit or a bulkhead wall in certain embodiments.

Figure 5:
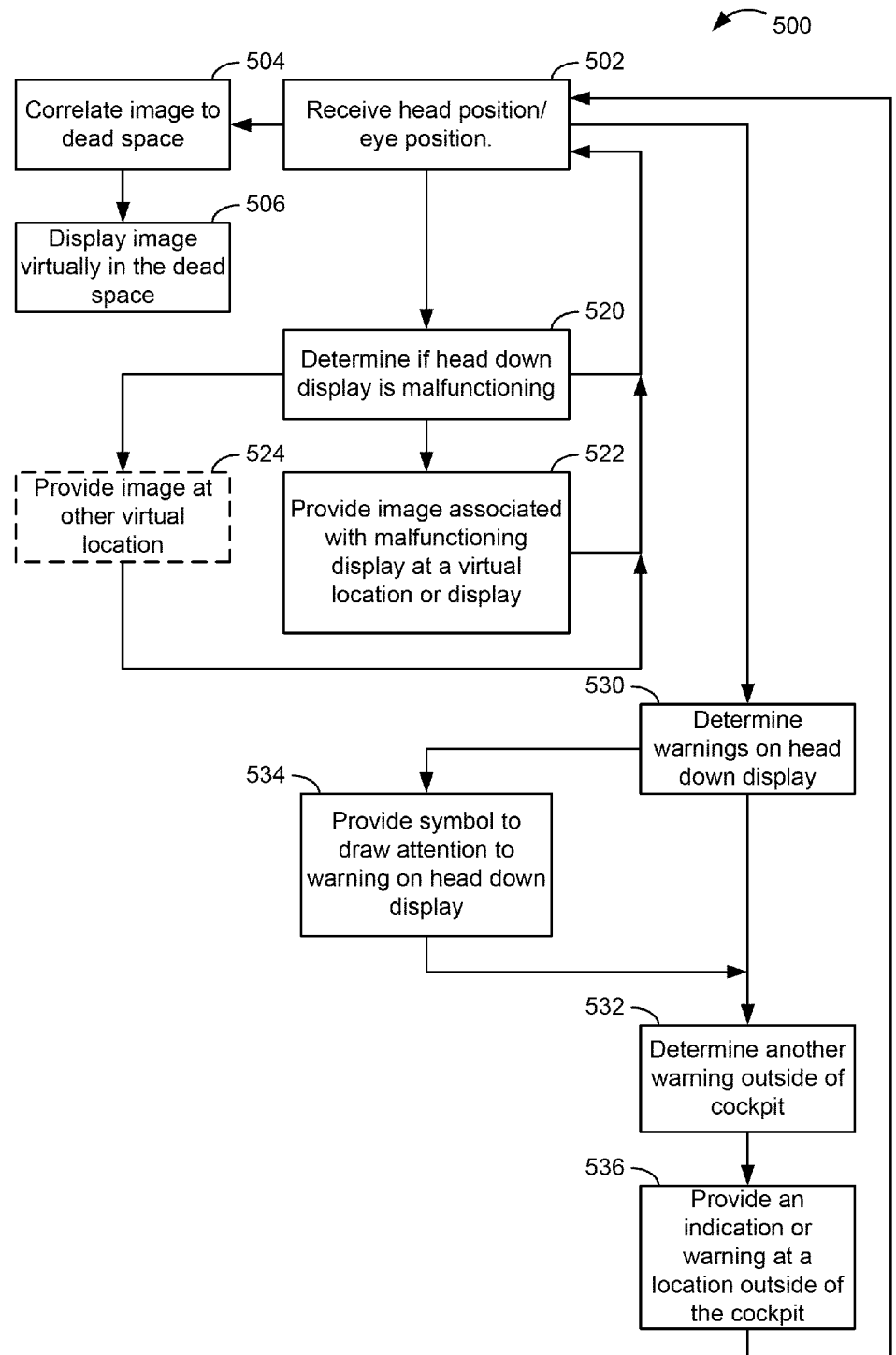
FIG. 5 is a general flow diagram of a process used by the virtual display system illustrated in FIG. 1 in accordance with still another embodiment.

With reference to FIG. 5, systems 10, 200, 300 and 400 can operate according to a process 500. Process 500 can be performed by computer 26 executing the software or instructions according to various embodiments. In one embodiment, process 500 receives a head position or eye position at an operation 502. At an operation 504, the virtual location of dead space is determined using the gaze information. At an operation 506, information is displayed virtually in the dead space.

In an operation 520, the status of a HDD is determined. If a head down display is malfunctioning, an image associated with the malfunctioning display can be provided at a virtual location associated with the malfunctioning display. In one embodiment, a malfunction is determined by a camera or other device which determines if a HDD (source 12) is black indicating it is non-functional. In one embodiment, the camera is part of view tracker 36. Alternatively, at an operation 524, the image associated with the malfunctioning display can be provided at another location.

At an operation 530, the presence of warnings on HDDs can be determined. If warnings are present on a HDD, symbols can be provided virtually to draw attention to the warning on the HDD at an operation 534. If a warning is provided outside a cockpit or off of a display HDD at an operation 532, an indication of the warning location can be virtually provided at an operation 536. The head position and eye position received at operation 502 can be used to determine the relative location of the warnings to provide an appropriate pointing indicator.

Although exemplary embodiments are described with respect to cockpit environments, the display technology described herein can be utilized in other environments including tiled display or panel display environments outside of the cockpit. For example, the systems 10, 200, 300 and 400 can be utilized to provide panoramic views in tile displays. For example, systems 10, 200, 300 and 400 can be utilized to provide large seamless map displays and redundant displays in other applications without departing from the scope of the claims. Systems 10, 200, 300 and 400 can be utilized to provide a large airport map panoramically covering several displays and providing information between scenes between the displays.

While the detailed drawings, specific examples, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the communications devices. For example, the type of system components and their interconnections may differ. The systems and methods depicted and described are not limited to the precise details and conditions disclosed. The figures show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus in an environment, the environment comprising a plurality of target areas, the target areas each disposed at a respective target area position and separated by a gap, the apparatus comprising:
an image source; and
a combiner configured to:
receive an image from the image source; and
provide the image virtually at a location associated with the target areas and the gap when the combiner is viewed from a user position viewing the target areas;
wherein the combiner is part of a head worn display.

2. The apparatus of claim 1, wherein the image comprises information associated with the target areas.

3. The apparatus of claim 1, wherein the image comprises head-up display (HUD) symbols provided virtually at a location outside of a windshield.

4. The apparatus of claim 1, wherein a first target area of the plurality of target areas is a first head down display source.

5. The apparatus of claim 1, further comprising:
a head tracking device, wherein the image is provided in accordance with a head position.

6. The apparatus of claim 1, wherein the combiner is fixed to a helmet.

7. The apparatus of claim 6, wherein the combiner is a waveguide combiner.

8. An apparatus in an environment, the environment comprising a plurality of target areas, the target areas each disposed at a respective target area position and separated by a gap, the apparatus comprising:
an image source; and
a combiner configured to:
receive an image from the image source; and
provide the image virtually at a location associated with the target areas and the gap when the combiner is viewed from a user position viewing the target areas;
wherein a first target area of the plurality of target areas is a first head down display source, and wherein the first head down display source is at least one of non-functional, malfunctioning, and powered off.

9. An apparatus for providing a virtual display in an environment including a head down display source, the apparatus comprising:
a computer configured to determine that the head down display source is in a failed mode; and
a combiner configured to provide a virtual display of an image from an image source in response to the head down display source being in a failed mode, wherein the virtual display is provided at a location associated with the head down display source.

10. The apparatus of claim 9, wherein the image is comprised of primarily flight data and the combiner receives light from a real world scene.

11. The apparatus of claim 9, wherein the combiner is a near eye fixed waveguide combiner.

12. The apparatus of claim 9, further comprising:
a head tracking device, wherein the image is provided in accordance with a head position.

13. The apparatus of claim 9, wherein the combiner is a head worn combiner.

14. The apparatus of claim 9, wherein the head down display source is a panel display image source.

15. A method for providing a virtual display in an environment, the method comprising:
determining a status of a first head down display source in the environment; and
providing an image associated with the first head down display source at a virtual location based on the status, wherein the status indicates that the first head down display source is malfunctioning.

16. The method of claim 15, wherein the virtual location is a target location associated with the first head down display source.

17. The method of claim 15, wherein the virtual location correlates to dead space in the environment.

18. The method of claim 17, wherein the dead space comprises a gap between the first head down display source and a second head down display source.

19. The method of claim 15, wherein the status of the first head down display source is determined by a camera.

* * * * *